United States Patent [19]
Burke

[11] Patent Number: 6,076,343
[45] Date of Patent: Jun. 20, 2000

[54] GRAPE PICKING HEAD AND DRIVE THEREFOR

[75] Inventor: Desmond Charles Burke, Mildura, Australia

[73] Assignee: U.R. Machinery (Sales) Pty. Ltd., Australia

[21] Appl. No.: 09/121,405

[22] Filed: Jul. 23, 1998

[51] Int. Cl.⁷ ................................................. A01D 46/00
[52] U.S. Cl. ...................... 56/330; 56/328.1; 56/DIG. 19
[58] Field of Search .................................. 56/328.1, 330, 56/340.1, DIG. 19

[56] References Cited

U.S. PATENT DOCUMENTS

| | | | |
|---|---|---|---|
| 3,535,856 | 10/1970 | Olmo et al. ............................. | 56/328.1 |
| 3,546,856 | 12/1970 | Hiyama ................................... | 56/328.1 |
| 4,112,657 | 9/1978 | Benac et al. ............................. | 56/330 |
| 4,114,463 | 9/1978 | Garden et al. . | |
| 4,283,906 | 8/1981 | Scudder . | |
| 4,286,426 | 9/1981 | Orlando et al. . | |
| 4,336,682 | 6/1982 | Orlando . | |
| 4,793,128 | 12/1988 | Creed ...................................... | 56/330 |
| 4,860,529 | 8/1989 | Peterson et al. ......................... | 56/330 |
| 4,944,387 | 7/1990 | Burke . | |
| 5,027,593 | 7/1991 | Korthuis et al. ....................... | 56/328.1 |
| 5,259,177 | 11/1993 | Windemuller et al. . | |
| 5,421,148 | 6/1995 | Caraway ................................. | 56/328.1 |
| 5,765,349 | 6/1998 | Michelson .............................. | 56/328.1 |
| 5,765,350 | 6/1998 | Ochse ..................................... | 56/328.1 |
| 5,904,034 | 5/1999 | Youman et al. ....................... | 56/328.1 |
| 6,003,294 | 12/1999 | Fitzgerald et al. ......................... | 56/30 |

*Primary Examiner*—Eileen Dunn Lillis
*Assistant Examiner*—Gary S. Hartmann
*Attorney, Agent, or Firm*—Watts, Hoffmann, Fisher & Heinke Co., L.P.A.

[57] ABSTRACT

A harvester especially for grape harvesting that has a picking head which includes a support frame and picking rods of fingers to contact the leaves and stems in the canopy of a grape vine to thereby shake the vines to remove grapes. The picking head includes one or more oscillation aims pivotably connected to the support frame on a respective pivot axis to allow oscillation about the respective pivot axis. The oscillation arms are pivotably connected with a respective picking rod or ringer support by a connection, so that the respective picking rod support is driven by the oscillation arm to oscillate in a picking direction. An oscillation flywheel is mounted on the oscillation are to impart an oscillating moment on the oscillation arm and the oscillation flywheel connected solely with the one or each of the oscillation arms.

29 Claims, 4 Drawing Sheets

GRAPE PICKING HEAD AND DRIVE THEREFOR

FIELD OF THE INVENTION

This invention relates to a harvester of the type that might be used for harvesting grapes and in particular to a picking head and drive for such a harvester.

BACKGROUND OF THE INVENTION

One type of harvester for grapes generally straddles a row of vines and either is driven or towed along the row to progressively harvest grapes along the row. The picking is effected by a picking head which includes opposing banks of picking rods supported on opposing sides of the row. The picking rods oscillate into and out of the vines, to grip and shake the vines so as to shake the grapes from the vines. The grapes that are removed, fall onto interleaved and pivotable collecting plates supported at a lower portion of the conveying frame which plates direct the grapes to a conveyor system, for carrying the grapes to a collection vessel such as a hopper. An example of type of harvester is disclosed in U.S. Pat. No. 4,944,387 by Burke.

A second type of harvester is frequently used in harvesting raisins because of the different shaped trellis support. Raisins are grown on specialised trellises that provide supporting surfaces that in alternate years are used for training new growth onto or for supporting cut vines to hang the drying raisins. Harvesters used for normal grape trellises are not effective at removing raisins from such raisin trellises because the growing surfaces are angled upwardly. In place of the opposing banks of picking rods, is a roller drum which can roll along the direction of the trellises, the roller drums including a great number of radially extending picking fingers. The roller drum is supported on a pivoting arm, the angle of the pivoting arm can be changed to support the roller drum to suit the trellis type. The striking force is effected by an oscillation movement being impacted axially onto the roller drum. This type of harvester is also used for harvesting other berries or grapes from other trellis arrangements.

In harvesters of the first type known to the inventor oscillatory movement is imparted onto the rods via a driving arm eccentrically connected to a driving shaft. Generally there is a separate driving shaft for each arm extending vertically on a respective side of the harvester and the two driven shafts are, together, driven by a common drive which is connected to a motor. These eccentric drives are positively connected to the picking rods.

This arrangement has several disadvantages. When driven under moderate load this direct coupling arrangement is adequate, however, invariably in order to get sufficient penetration into the vine canopy the harvesting head is driven relatively hard. Under these circumstances the unbalanced eccentrically weighted load has an adverse, wearing, effect on the drive mechanism.

Additionally direct coupling also has an adverse effect when an uneven load is applied between the two opposing banks of shaker rods and consequently the respective driven shafts, such as occurs at the ends of a row or when a bank (or roller) of picking rods contacts a strainer post or trellis cross arm.

Furthermore, it is difficult to achieve an appropriate balance between the force exerted by the picking rods, the amplitude of the stroke of the rods and the frequency of stroke. It is desirable to vary all three of these parameters so as to achieve an effective harvest yet minimise damage to the crop and trellis system. A combination of variation of these three parameters will give best results. In prio art machines the amplitude can vary as can the frequency of vibration, however increased force can only be achieved by increasing the amplitude or speed, and this often results in a balance that is less than desirable, especially given the limitation in speed of existing machines. In effect the means of adjusting the picking head for more power is to increase the amplitude, which imparts too great a force on the trellis system with consequent greater damage and hence increased cost of maintenance. Additionally there is also a greater risk of vine breakage which, if severe enough, will result in a decrease in yield in subsequent harvests.

Orlando et al in U.S. Pat. No. 4,286,426 and Orlando in U.S. Pat. No. 4,336,682 have suggested the use of a non-positive oscillatory drive mechanism in the form of eccentrically mounted weight on a fruit harvester. The suggested harvester comprises two solid striker bars each mounted to be positioned on opposing sides of the sides of the trunks of a vine on one of two calipers. A pair of eccentric weights are mounted one on a respective one of the two calipers to provide a sideways rocking motion of the harvester, so that the striker bars alternatively strike the trunks of the vine. The problem with this type of harvester is however that it is not as effective at harvesting because generally it is far better to the contact the grapes in a more direct fashion, and more evenly over the vine. The particular manner of contact with the vine is important and it is desirable to provide a high frequency contact with the vine as broadly as possible distributed over the vine.

Scudder in U.S. Pat. No. 4,283,906 suggests non-positively coupling out of balance weights to the top of a drum-type picking head. These eccentrics however, do not provide for an axial oscillatory component to the picking head but rather give a radial oscillatory component. The oscillatory movement of Scudder relates to penetration into the vine, rather than relating to a direct picking effect.

Windemuler et al in U.S. Pat. No. 529,177 also relates to a drum type picking head. This disclosure shows the coupling of an eccentric motor to the top of a shaft supporting a drum type picking head. The picking head is vibrated axially by the eccentric motor.

OBJECT OF THE INVENTION

It is an object of the present invention to provide a harvester of the type suitable for harvesting grapes with a picking drive mechanism which obviates or minimises any one of the above problems or at least provides the public with a useful choice.

SUMMARY OF THE INVENTION

In one form, although not necessarily the broadest or only form the invention could be said to reside in a harvester with a picking head including
  a support frame,
  one or more oscillation arms pivotably connected to the support frame on a respective pivot axis, whereby to allow oscillation about the respective pivot,
  the one or each of said oscillation arms pivotably connected with a respective picking rod or finger support by a connection, whereby the respective picking rod or finger support is driven by the oscillation arm to oscillate in a picking direction,
  said picking rod or finger support adapted to carry picking rods or fingers for contacting a plant to be harvested, an oscillation means mounted on the oscillation arm to impart an oscillating moment on the oscillation arm, said oscillation means connected solely with the one or each of said oscillation arms.

An advantage of the present invention is that excessive resistance to oscillation of the picking rods or fingers does not cause excessive wear as a result of compressive or tension forces between the oscillation arm and other parts of the harvester or the picking head, and an oscillation moment is built up within the oscillation arm which additionally can provide a means to give good control over the quality and quantity of the oscillation.

Preferably the oscillation arm is supported by the support frame so as to restrict oscillation in one plane so as to minimise the energy input required to achieve the desired oscillation of the picking rods or picking fingers.

It will be understood that there is a choice of the oscillation means. For example, the oscillation means may be a pneumatic discharge oscillator, or an electrically pulsed oscillation means, or an out of balance flywheel. It will be appreciated however that because the oscillation means is solely connected with the oscillation arm that it is not mechanically connected to the drive of the picking rods.

In one form the picking head is for picking of vines whereby opposing banks of picking rods are supported on opposing sides of the picking head support frame and are spaced apart to straddle a row of vines such that the said picking rods can apply a shaking force to opposing sides of the row of vines, wherein each bank of picking rods is oscillated by a respective one of two oscillation arms, each driven respectively by a separate respective oscillation means, and the picking head includes a co-ordination means whereby to co-ordinate the phase of oscillation of the opposing banks.

The co-ordination means may be adjustable so the rods can either beat in phase, that is to beat towards a medial line within the picking head at the same time, or alternatively the rods can beat out of phase so that when one bank is beating inwardly the other is beating outwardly.

This arrangement including co-ordination means will be understood to be applicable also where the picking head includes alternate means to strike a row or trellis of grapes from opposing sides.

The co-ordination means could be achieved in a number of ways depending upon the nature of the oscillation means. In one convenient form the respective oscillation means are eccentrically weighted flywheels each driven by a respective hydraulic motor, and serviced preferably by a common source of hydraulic pressure. Preferably each of the flywheels is journaled onto a flywheel shaft, which has also journaled onto it a flywheel shaft gear, a timing shaft extends across the picking head, and each end part has a timing shaft gear, positioned so that a timing belt or chain can be entrained around both the eccentric shaft gear and the timing gear so that rotation of the two eccentric weighted flywheel are co-ordinated.

Another application of this invention is for a harvester with a picking head whereby a rotating drum is supported to rotate at either end of the drum by a respective one of two oscillating arms, the two oscillating arms are also pivoted on a support frame, the oscillation means is connected between the two oscillation arms to cause substantially the same oscillation in both arms, and to thereby transmit an axial oscillation on the drum, said drum supporting a plurality of picking fingers for effecting picking of fruit from vines when supported in contact therewith.

Preferably the invention includes a limiting means to limit the amplitude of oscillation of the oscillation arm.

Alternatively the invention could be said to reside in a harvester with a picking head whereby a rotatable drum is supported to pivot at either end of the drum by a respective one of two oscillating arms, the two oscillating arms are also pivoted on a support frame, the oscillation means is connected to transmit an oscillation force to al least one of said oscillation arms, and to thereby transmit an axial oscillation on the drum, said drum supporting a plurality of picking fingers for effecting picking of fruit from vines when supported in contact therewith.

It will be understood that forms of the invention will be applicable to a number of crops which might include, grapes, berries, bean crops such as coffee.

BRIEF DESCRIPTION OF THE ILLUSTRATED EMBODIMENTS OF THE INVENTION

For a better understanding the invention will now be described with reference to two embodiments as illustrated in the accompanying drawings wherein:

FIG. 1 is a perspective part view of a picking head according to a first embodiment of this invention, and FIG. 2 is a further perspective view of one half of a picking head of a variant of the first embodiment, FIG. 3 is a front view of the half of the picking head shown in FIG. 2, FIG. 4 is a side view of the half of the picking head shown in FIG. 2, FIG. 5 shows the set positions of the eccentric weights, FIG. 6 shows a side view of a picking head according to a second illustrated embodiment, FIG. 7 is a view from above of the picking head shown in FIG. 6, and FIG. 8 is a side view of the picking head shown in FIG. 7.

DETAILED DESCRIPTION OF THE ILLUSTRATED EMBODIMENTS OF THE INVENTION

Figure 1:
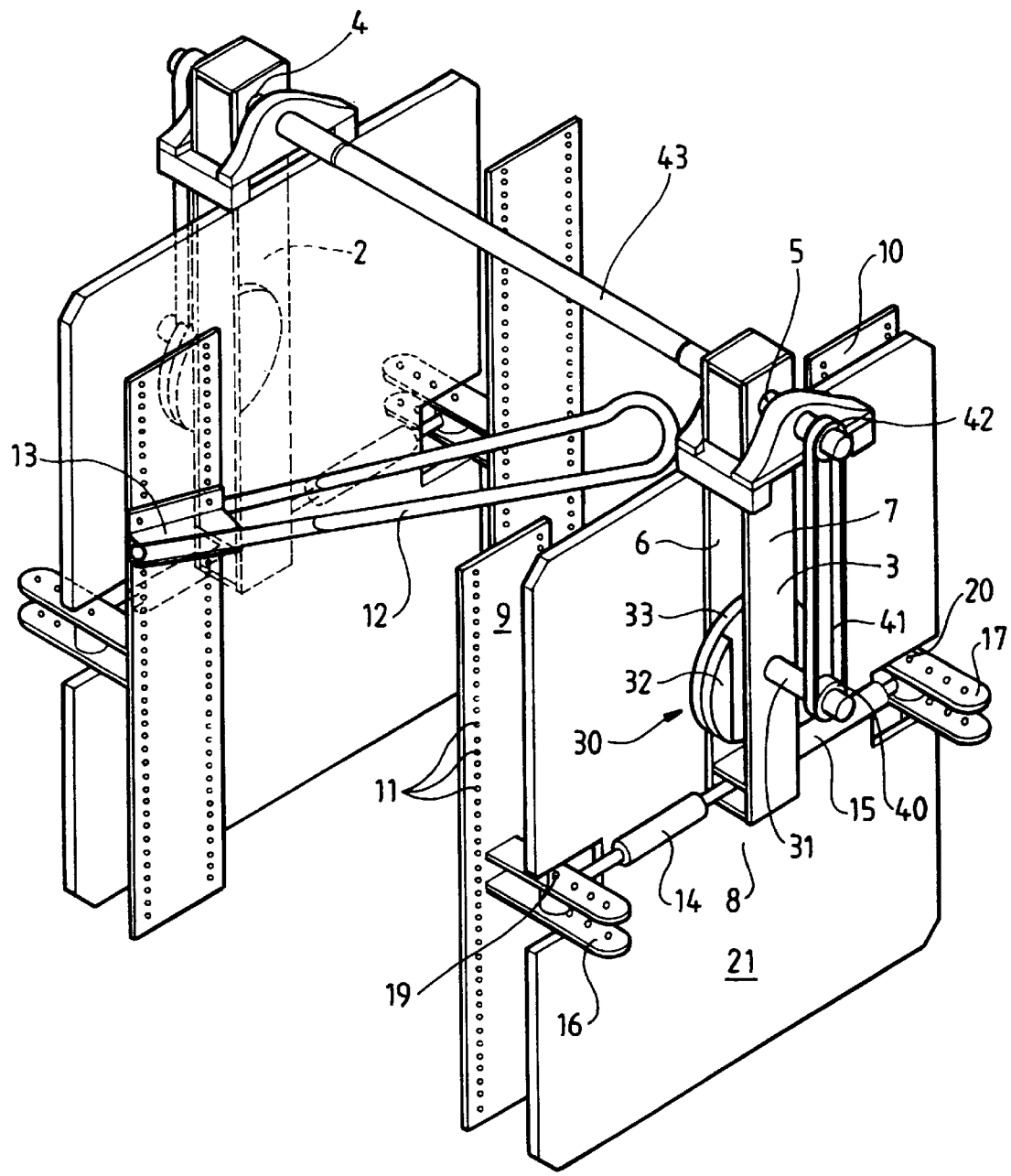

Similar reference characters indicate corresponding parts throughout the several views of the drawings.

Dimensions of certain of the parts as shown in the drawings may have been modified and/or exaggerated for the purposes of clarity of illustration.

FIG. 1 is a partial view of a picking head of a grape harvester showing the working of the invention. A support frame is shown in part as (1). It will be appreciated that parts of the harvester are not shown and that the support frame is only shown in part. This support frame may, as is known in the prior art, permit banks of picking rods towards and away from each other. Two oscillation arms (2, 3), one partly in broken lines are shown to be pivoted relative to the support frame, each about a respective pivot (4, 5). Both oscillation arms (2, 3) are formed from two spaced apart webs of steel (6, 7) and have, at an upper end an aperture into which a shaft (5a) is journaled, which arrangement permits oscillation within a plane of the pivot but restricts movement outside of that plane.

Figure 2:
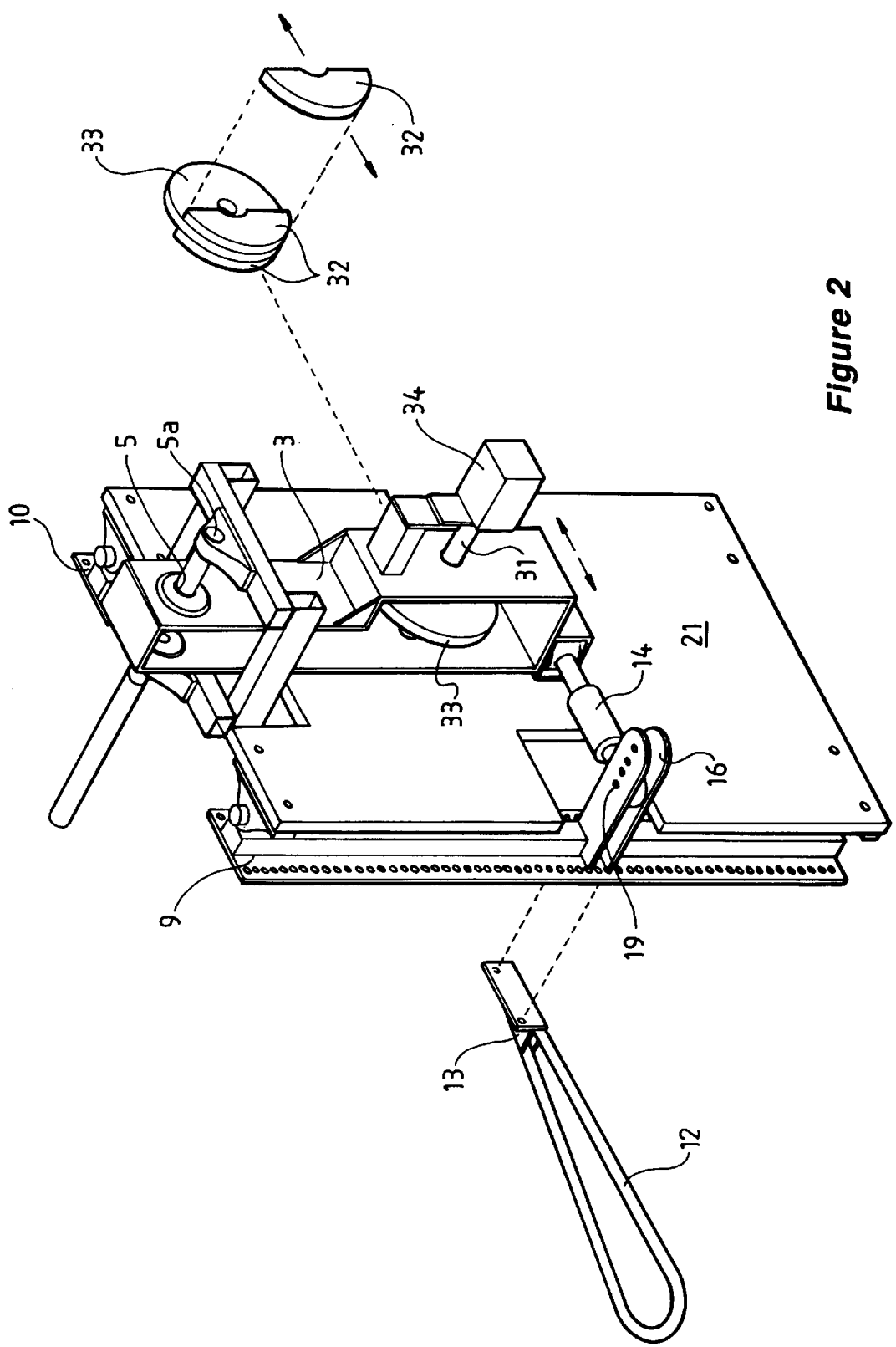

A lower end (8) of each of the oscillation arms is connected with two finger, or rod, supports (9, 10). The finger support are upright elongate steel plates with apertures (11) positioned appropriately to carry the desired number of picking rods (12), and holders (13). The connection is made by two turnbuckles (14, 15) extending away one either side of the oscillation are that are connected with a respective finger support arm (16, 17) at a finger support arm pivot (19, 20). The finger carriers are pivotably connected to the support frame, at a pivot position spaced away from the finger support arm pivot (19, 20), so that on oscillation of the oscillation arm, the finger supports are moved in an arc, so that the free ends of the picking rods are moved inwardly to a medial position in the picking head. This is best shown in FIG. 2 where it can be seen that the finger carries are supported at the top and bottom to a side plate (21) by a respective bearing. The amplitude of the stroke of the picking rods can be adjusted by varying the connection between the finger support arm (16) and its respective turnbuckle (14). The extent to which the rods penetrate a vine can also be varied by adjusting the turnbuckle so that the curved end of the picking rod approaches the medial position in the picking head more closely or crosses it as desired. As two independent turnbuckles and two finger support arms are provided, it can be seen that the banks of picking rods held by the two finger supports can be adjusted independently of one another, so that for example, a leading of the banks may be designed to be angled inwardly less and have a stroke of smaller amplitude that a following of the banks which could be adjusted to dislodge the more resilient of the grapes by having a greater amplitude of oscillation and be angled inwardly more than the leading bank.

Figure 5:
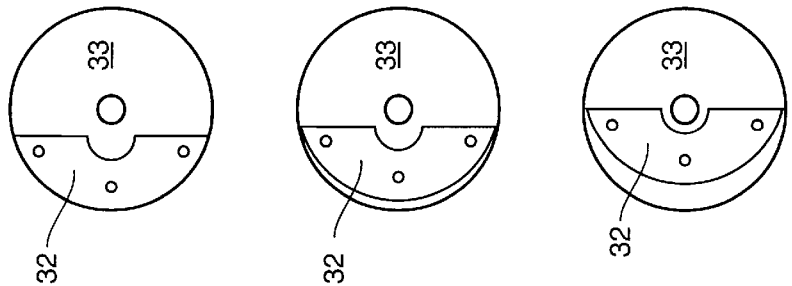
Figure 4:
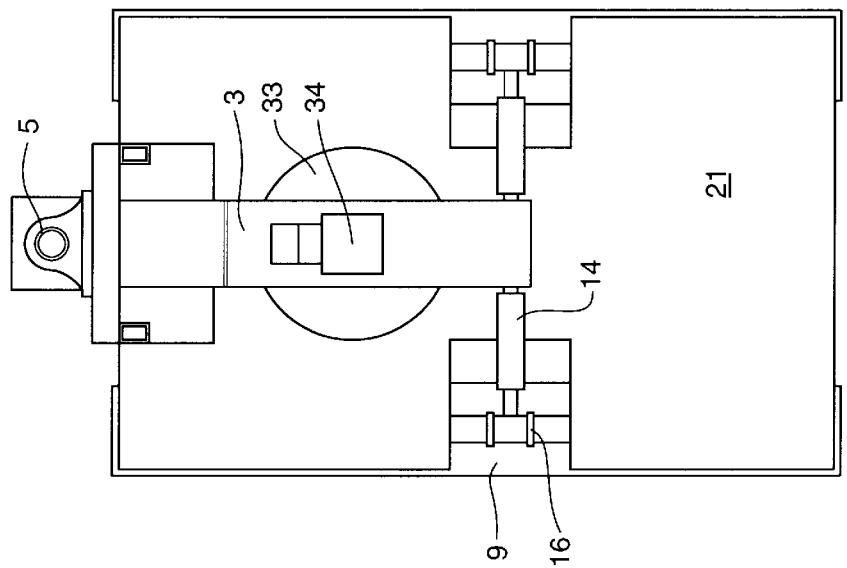
Figure 3:
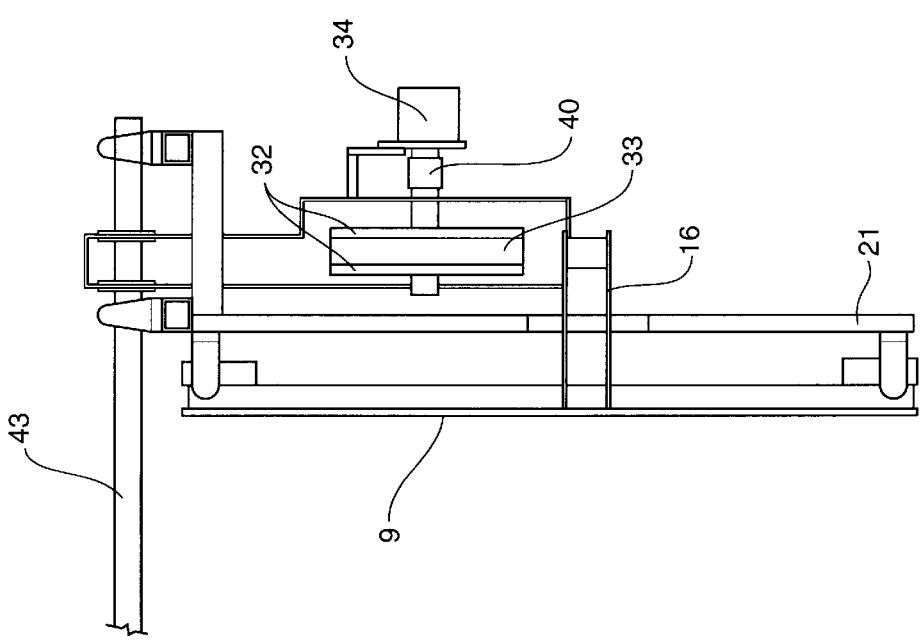

Oscillation means (30) in this embodiment takes the form of an out of balance flywheel which is keyed onto a flywheel shaft (31). The flywheel shaft is journaled through the two webs of steel forming the oscillation arm (2, 3), and is driven by a hydraulic motor (34). The flywheel includes an eccentric weight (32) which is fastened to the flywheel (33), by removable fasteners, perhaps by bolting. It will be realised that on rotation of the out of balance flywheel, an oscillation will be effected in the oscillation arm. The number of eccentric weights could be varied. If there is a greater eccentric weight, the force of each stroke will be higher, but the amplitude will not vary. Thus the magnitude of force can be varied for each stroke independent of the frequency or amplitude of the stroke. The position of the eccentric weight on the flywheel can also be varied. The varying positions are illustrated in FIG. 5. The further away the eccentric weight is from the flywheel shaft the greater the amplitude of the swing of the oscillation arm, and consequently the picking rods. The amplitude increase however is not accompanied by a significantly greater force. This then represents an extra control of the degree of penetration of the picking rods into the canopy of the vines.

It may be desired to provide limit means to limit the amplitude of oscillation of the oscillation arm this could be provided by an elastomeric block restraining the sidewards movement of a respective finger support arm.

Additionally it can be seen that the oscillation means is connected solely to the oscillation arms, and is not incorporated into driving the finger support directly, nor is it connected between the drive of the finger support and the support frame, and thus increased loads do not adversely effect either the drive or the harvester excessively. Thus where the picking rods may be prevented from beating as a result of a contact with a trainer post, the flywheel can still freely rotate without excessive strain on the means to drive the finger carriers.

It can also be seen that each of the oscillation arms is substantially balanced when in a vertical position depending from the pivot point (5) in a resting position. Additionally it can be seen that the oscillation means is positioned some distance away from the pivot point and it is journaled into the oscillation arm greater than half way between the pivot point and the free end of the oscillation arm. This arrangement is conducive to allowing an oscillation moment to develop in each oscillation arm separately.

It is also desirable that the oscillations induced in opposing banks of picking rods is coordinated and generally it is preferred that opposing banks beat in phase; thus both banks of rods beat inwardly towards the medial line at the same time, although there may be circumstances where it is desired that opposing banks of rods beat out of phase. It can be seen that in FIG. 1 that the weight attached to both flywheels is in phase, and facing what would be, during operation, the front of the harvester.

A single hydraulic supply line is split into two hydraulic feed lines one for each hydraulic motor driving a respective out of balance flywheel. A respective flywheel shaft (31) extends past the oscillation arm sufficiently for a flywheel shaft gear (40) to be keyed thereonto. A timing belt (41) is entrained about the flywheel shaft gear (40) and a timing shaft gear (42) which is keyed onto a timing shaft. The timing shaft (43) is thus rotated by both timing belts, to thereby co-ordinate the beating of opposing banks of rods. It will be understood that the gears and timing belt are selected so that both flywheels are to rotate at the same speed.

It will also be understood that because the oscillation means is not mechanically connected with the drive means of the finger support and typically the amplitude of the stroke of opposing carriers will vary depending upon the resistance that is exited thereon and the quantity of the eccentric weight. The picking rods may stop altogether notwithstanding that the rotation of the flywheels are still co-ordinated.

It is found with this arrangement that the picking rods can beat at a far higher frequency than conventionally driven picking heads. Speeds in excess of 1000 beats per minute have been achieved in preliminary work, and it may be possible to achieve sustainable speeds as high as 1500. This is far more desirable because the vines can be shaken at a high frequency and low amplitude to cause less damage and greater harvesting effectiveness. This compares with speed of about 300 to 500 that are currently employed.

Figure 8:
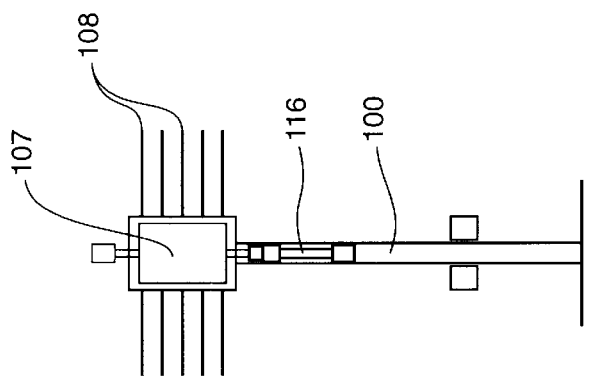
Figure 6:
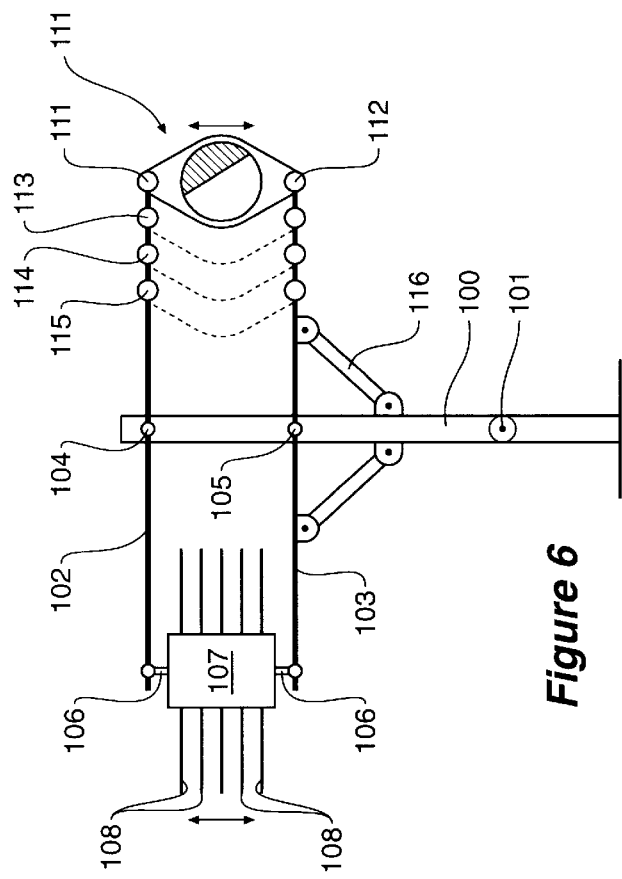
Figure 7:
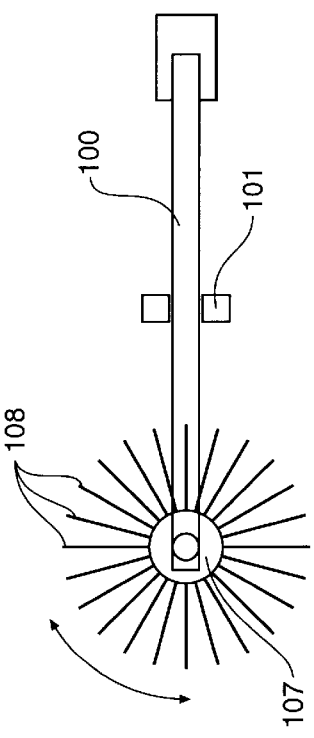

A second embodiment is shown in FIGS. 6 to 8. The support frame (100) is a single RHS section member and may be mounted on a suitable vehicle. The support frame is pivotable about pivot (101) so it can be adjusted to suit the trellis support of the raisins. A pair of spaced apart oscillation arms (102, 103) are pivotably supported by the support frame about pivots (104, 105) at a respective central pail of each of the oscillation arms. A first end of each of the oscillation arms are pivotably connected with a finger drum shaft (106) to hold said shaft therebetween. A hollow finger drum (107) is journaled for rotation onto the finger drum shaft (106), the finger drum supporting a plurality of axially and circumferentially spaced picking fingers (108). The oscillation means (110) is pivotably connected at a second end part of each of the oscillation arms about pivots (111, 112).

The amplitude of the oscillation imparted onto the picking fingers (108) can be varied dependent upon where the oscillation means is positioned on the second end part. It can be seen that the illustrated embodiment has four different positions for the oscillation means (111, 113, 114, 115).

The oscillation means illustrated takes on a form very similar to the oscillation means of the first embodiment, whereby an out of balance flywheel is rotated by an hydraulic motor driven by an hydraulic supply line. As with the out of balance flywheel of the first embodiment, the heaviness of the eccentric weight can be varied as can the degree to which the weights are eccentric.

It is desirable to have the harvesting head balanced about the support frame, and thus it can be seen that the weight on the two sides of both of the oscillation arms is approximately balanced. Where the oscillation means is brought closer in than depicted in FIG. 2, it may be desired to add further weights to balance the oscillation arms. As with the first embodiment the oscillation arm is substantially balanced with the picking head counter weighted by the oscillation means. The oscillation means is positioned spaced apart from the pivots (104, 105). Limiting means are provided to limit the amplitude of the oscillation and these are in the form of two elastomeric blocks (116) bracing between the lower of the oscillation arms (103) and the support frame (111) to bring the oscillation arms to a resting position when not in use. By this arrangement an oscillation moment is allowed to develop.

It will be understood that the oscillation arm can be balanced in a manner other than is illustrated in this second embodiment. Thus for example a counterweight could be positioned in place of the oscillation means. It is conceivable that the oscillation means is mounted on the same side as the picking head and perhaps even over the picking head which being appropriately counterweighted or biased back to a balanced position. It may be desirable to use a spring means, such as an elastomeric block to either facilitate the biasing against the weight of the picking head or to be the sole biasing means against the picking head.

It can also be seen that the position of the axis of the picking head remains the same despite variations in vertical position, because the two oscillation arms, the support post and the axis of the picking head describe a parallelogram.

Vertical vibrations are imparted on the finger drum and picking fingers, which vertical movement strikes the grapes to harvest them. Should an obstacle be struck such as the wires of a raisin trellis, then the drive mechanism will not be damaged because it is not mechanically coupled to the oscillatory movement of the fingers. The picking head is also free to rotate but it is not driven to rotate. When the picking head is carried through a vine it will tend to rotate on contact with the vine.

What is claimed is:

1. A harvester with a picking head including
a support frame with at least on oscillation arm pivotably connected to the support frame on a respective pivot axis, the at least one oscillation arm being pivotably connected with a respective picking support adapted to carry selected ones of picking rods and fingers for contacting a plant to be harvested, and an oscillation means mounted on and connected solely with the oscillation arm to impart an oscillating moment thereon so that the respective support is driven by the oscillation arm to oscillate in a picking direction, the oscillation means thereby providing a non positively coupled drive to the oscillation arm to allow rational oscillation about the respective pivot.

2. A harvester as in claim 1 wherein the oscillation are is supported by the support frame so as to restrict oscillation of the oscillation arm in one plane.

3. A harvester as in claim 2 wherein the picking head is for picking of vines and whereby opposing picking rod supports are adapted to support respective banks of picking rods and are supported on opposing sides of the support frame and are spaced apart to straddle a row of vines such that the said picking rods supported by the picking rod supports can apply a shaking force to opposing sides of the row of vines, wherein there are a plurality of oscillation arms and each bank of picking rods is oscillated by a respective one of said oscillation arms, each oscillation arm driven respectively by a separate respective oscillation means.

4. A harvester as in claim 3 wherein the picking head includes a coordination means whereby to coordinate the phase of oscillation of the opposing picking rod supports.

5. A harvester as in claim 4 wherein the co-ordination means is adjustable so both opposed picking rod supports can either oscillate in phase or alternatively the rods can oscillate out of phase.

6. A harvester as in claim 3 wherein the respective oscillation means are eccentrically weighted flywheels each driven by a respective motor.

7. A harvester as in claim 6 wherein the respective motors are hydraulically driven by a common source of hydraulic pressure.

8. A harvester as in claim 3 wherein the respective oscillation means are pneumatically discharged oscillators.

9. A harvester as in claim 3 wherein the respective oscillation means are electrically pulsed oscillators.

10. A harvester as in claim 6 wherein each of the flywheels is journaled onto a flywheel shaft, which has also journaled thereonto a flywheel shaft gear, a timing shaft extends across the picking head, and each end part has a timing shaft gear is positioned so that a selected one of a timing belt and a chain can be entrained around both the eccentric shaft gear and the timing gear so that rotation of the two eccentric weighted flywheel are co-cordinated.

11. A harvester as in claim 6 wherein the weighting of the flywheel is provided by at least one detachable weight being, said detachable weight adjustable to alter the force of the oscillations.

12. A harvester as in claim 6 wherein the speed at which the flywheel is rotated can be varied incrementally by speed control means.

13. A harvester as in claim 3 wherein the picking rod support includes a connection arm extending from the picking rod support and is pivotably fixed at a central portion thereof, and having a free end being pivotably connected to a connecting rod which connecting rod is also connected with a lower portion of the oscillation arm, whereby on oscillation of the oscillation arm, the free end of the connection arm moves in the same direction as the connecting rod, and by reason of being pivotably fixed causes the picking rod support to swing in an opposite direction, to thereby give a shaking effect which during use is imparted on the plant to be harvested.

14. A harvester as in claim 3 wherein the oscillation arms are on the outside of a side wall, and the picking rod holder is positioned inside of the side wall, the picking rod holder includes a connection arm extending from the picking rod holder through the side wall, and pivotably connected with respect thereto, and having a free end extending on the outside of the side wall for connection therewith, a connecting rod being pivotably connected with the free end of the connecting arm and connected with a lower portion of the oscillation arm, whereby on oscillation of the oscillation arm, the free end of the connection aim moves in the same direction as the connecting rod, and by reason of the pivotable connection with the side wall causes the picking rod support to swing in an opposite direction, to thereby give a shaking effect which during use is imparted on the plant to be harvested.

15. A harvester as in claim 13 wherein the connecting rod is a turnbuckle which length can be adjusted to thereby adjust a degree to which the picking rod support is angled centrally of the picking head.

16. A harvester head as in claim 15 wherein the connecting rod can be coupled at varying distances from the fixed pivotable connection to vary the amplitude of the stroke of the picking rod support and picking rods.

17. A harvester head as in claim 3 whereby each oscillation means is coupled to two picking rod supports, one forward and one aft relative to the direction of picking, whereby resistance to oscillation is substantially balanced.

18. A harvester as in claim 1 including a limiting means to limit the amplitude of oscillation of the oscillation arm.

19. A harvester with a picking head including a support frame with two oscillation arms pivotally connected to the support frame each on a respective pivot axis, the two oscillation arms rotatably supporting a rotatable drum therebetween, and an oscillation means connected to at least one of said oscillation arms to impart a vertical oscillating moment thereon so that the rotatable drum is driven by the oscillation arm to oscillate in a vertical direction, said drum supporting a plurality of picking fingers extending radially therefrom for effecting picking of fruit from vines when in use.

20. A harvester as in claim 19 wherein one oscillation means is provided and is connected between the two oscillation aims to thereby transmit an oscillation directly to both oscillation arms.

21. A harvester as in claim 19 wherein said drum is supported in an upright position.

22. A harvester as in claim 19 wherein the supporting frame is an upright post and the oscillation arms extend substantially greater to one side of the upright post, said picking head and said oscillation means being supported on the one side of the upright post, there being provided a biasing means to bias the oscillation arms to a resting position.

23. A harvester as in claim 22 wherein the biasing means is a spring bearing against at least one of the oscillation arms.

24. A harvester as in claim 22 wherein the resting position is substantially level with ground supporting the harvester.

25. A harvester as in claim 19 wherein the inclination of the oscillation arms can be varied to suit the row being harvested.

26. A harvester with a picking head whereby a rotatable drum is supported to pivot at an end of the drum by a respective one of two oscillating arms, the two oscillating arms are also pivoted on a support frame, the oscillation means is connected to transmit a vertical oscillation force to at least one of said oscillation aims, and to thereby transmit an axial oscillation on the drum, said drum supporting a plurality of picking fingers for effecting picking of fruit from vines when supported in contact therewith.

27. A harvester with a picking head including (a) a support frame, (b) at least two oscillation arms each pivotally connected to the support frame on a respective pivot axis, whereby to allow oscillation about the respective pivot, (c) at least one of said oscillation arms being pivotally connected with a respective picking support, whereby the respective picking support is driven by at least one oscillation arm to oscillate in a picking direction, (d) said picking support being adapted to carry selected ones of picking rods and fingers for contacting a plant to be harvested, (e) an oscillation means mounted on the oscillation arm to impart an oscillating moment on the oscillation arm, said oscillation means being connected solely with at least one oscillation arm, (f) the picking head being rotatable drum, said drum supporting a plurality of picking fingers extending radially therefrom for effecting picking of fruit from vines when in use, (g) said drum being rotatably supported between two oscillation arms, said oscillation means being connected to at least one of said oscillation arms, to axially oscillate said drum; and, (h) the support frame including an upright post and the oscillation arms extend substantially on either side of the upright post, said picking head being supported on one side of the upright post, and the oscillation means being supported on an opposite side of the upright post to provide a counter balancing.

28. A harvester as in claim 27 wherein the upright post, the oscillation arms and an axis of the drum describe a parallelogram so that the position of the axis of the drum remains the same despite variation in the vertical position of the drum.

29. A harvester with a picking head including (a) a support frame, (b) at least two oscillation arms pivotally connected to the support frame on a respective pivot axis, whereby to allow oscillation about the respective pivot, (c) at least one of said oscillation arms being pivotally connected with a respective picking support, whereby the respective picking support is driven by at least one oscillation arm to oscillate in a picking direction, (d) said picking support being adapted to carry selected ones of picking rods and fingers for contacting a plant to be harvested, (e) an oscillation means mounted on the oscillation arm to impart an oscillating moment on the oscillation arm, said oscillation means being connected solely with at least one oscillation arm, (f) the picking head being rotatable drum, said drum supporting a plurality of picking fingers extending radially therefrom for effecting picking of fruit from vines when in use, (g) said drum being rotatably supported between two oscillation arms, said oscillation means being connected to at least one of said oscillation arms, to axially oscillate said drum; and, (h) the supporting frame being an upright post and the oscillation arms extending substantially greater to one side of the upright post, said picking head and said oscillation means being supported on the one side of the upright post, there being provided a biasing means to bias the oscillation arms to a resting position; and, (i) the biasing means being a counterweight supported on at least one of said oscillation arms on a second side of the post opposite the first.

* * * * *